US008856669B2

(12) United States Patent
Goodman

(10) Patent No.: US 8,856,669 B2
(45) Date of Patent: Oct. 7, 2014

(54) METHOD FOR SELECTIVE ERASURE BASED ON HISTORICAL INPUT

(75) Inventor: Brian D. Goodman, West Redding, CT (US)

(73) Assignee: International Business Machines Corporation, Armonk, NY (US)

( * ) Notice: Subject to any disclaimer, the term of this patent is extended or adjusted under 35 U.S.C. 154(b) by 81 days.

(21) Appl. No.: 13/539,769

(22) Filed: Jul. 2, 2012

(65) Prior Publication Data

US 2014/0006983 A1 Jan. 2, 2014

(51) Int. Cl.
*G06F 3/048* (2013.01)
*G06F 3/0483* (2013.01)
*G06F 3/0488* (2013.01)

(52) U.S. Cl.
CPC ............ *G06F 3/0483* (2013.01); *G06F 3/0488* (2013.01)
USPC ............................ 715/764; 715/821; 715/863

(58) Field of Classification Search
CPC .. G06F 3/0483; G06F 3/04855; G06F 3/0488
USPC .......................................... 715/764, 863, 821
See application file for complete search history.

(56) References Cited

U.S. PATENT DOCUMENTS

| | | | | |
|---|---|---|---|---|
| 5,602,570 | A * | 2/1997 | Capps et al. .................. | 345/173 |
| 8,542,207 | B1 * | 9/2013 | Truta et al. .................... | 345/173 |
| 8,555,195 | B2 * | 10/2013 | Piersol et al. ................. | 715/787 |
| 2010/0295773 | A1* | 11/2010 | Alameh et al. ................ | 345/156 |
| 2010/0299642 | A1* | 11/2010 | Merrell et al. ................ | 715/863 |
| 2011/0126129 | A1* | 5/2011 | Nagahara et al. ............. | 715/753 |
| 2011/0320976 | A1* | 12/2011 | Piersol et al. ................. | 715/810 |

* cited by examiner

*Primary Examiner* — David Phantana Angkool
(74) *Attorney, Agent, or Firm* — Gibb & Riley, LLC

(57) ABSTRACT

Systems and methods record graphical marks input through a graphic user interface of a computerized device. The graphical marks comprise input other than keyboard button input. The recording includes recording different input times when the graphical marks are input and recording whether the graphic marks are uninterrupted graphic marks, using a processor of the computerized device. An uninterrupted graphical mark is one of the graphical marks that is input through a discrete and continuous user input action, and is made without the user pausing such discrete and continuous user input action. The systems and methods also display the graphical marks, and provide an erasure option on the graphic user interface. The erasure option allows the user to distinguish which of the graphical marks are erased based on the different input times and/or by distinguishing between erasure of different ones of the uninterrupted graphic marks.

24 Claims, 9 Drawing Sheets

100

102  104

Why is he being so silly? I th
1. She is so professional and in

Why is he being so silly? I th
1. She is s~  o~es  nc and in 110  116

FIG. 2

METHOD FOR SELECTIVE ERASURE BASED ON HISTORICAL INPUT

BACKGROUND

The present disclosure relates to graphic user interface interactions, and more specifically, to systems and methods that allow users to selectively erase graphical marks through such graphic user interfaces.

Advanced imaging programs offer the ability to create and erase data on a virtual canvas or layer through a graphic user interfaces using selection, masks, related tonal ranges. Further, the capability to "undo" previous actions allows users to remove content in order of history.

For example, graphic user interfaces use non-keyboard inputs (that can be entered through a touch-sensitive screen, a computer mouse, a touchpad, a stylus, a trackball, a joystick, and/or another other device that records user hand, finger, or extremity movements) to record graphic marks such as brushstrokes or pencil marks. Further, non-keyboard "erasers" can be used to erase previously made brushstrokes. However, such erasers fail to selectively erase strokes, especially when different brushstrokes overlap.

SUMMARY

One embodiment herein comprises a method that records graphical marks input through a graphic user interface of a computerized device. The graphical marks comprise input other than keyboard button input. The recording includes recording different input times when the graphical marks are input. The method also displays the graphical marks, and provides an erasure option on the graphic user interface. The erasure option allows the user to distinguish which of the graphical marks are erased based on the different input times.

Another exemplary method herein records graphical marks input through a graphic user interface of a computerized device. The graphical marks comprise input other than keyboard button input. The recording includes recording different input times when the graphical marks are input and recording whether the graphic marks are uninterrupted graphic marks, using a processor of the computerized device. An uninterrupted graphical mark is one of the graphical marks that is input through a discrete and continuous user input action, and is made without the user pausing such discrete and continuous user input action. The method also displays the graphical marks, and provides an erasure option on the graphic user interface. The erasure option allows the user to distinguish which of the graphical marks are erased based on the different input times and/or by distinguishing between erasure of different ones of the uninterrupted graphic marks.

A computerized apparatus embodiment herein includes a graphic user interface recording graphical marks and a processor operatively connected to the graphic user interface. The graphical marks comprise input other than keyboard button input. The processor records different input times when the graphical marks are input and records whether the graphic marks are uninterrupted graphic marks. Again, an uninterrupted graphical mark is one of the graphical marks that is input through a discrete and continuous user input action and is made without the user pausing the discrete and continuous user input action. The graphic user interface displays the graphical marks and provides an erasure option. The erasure option allows a user to distinguish which of the graphical marks are erased based on the different input times and/or by distinguishing between erasure of different ones of the uninterrupted graphic marks.

BRIEF DESCRIPTION OF THE DRAWINGS

The embodiments herein will be better understood from the following detailed description with reference to the drawings, which are not necessarily drawing to scale and in which:

FIG. 1 is a schematic diagram illustrating embodiments herein;

FIG. 2 is a schematic diagram illustrating embodiments herein;

DETAILED DESCRIPTION

Figure 3:
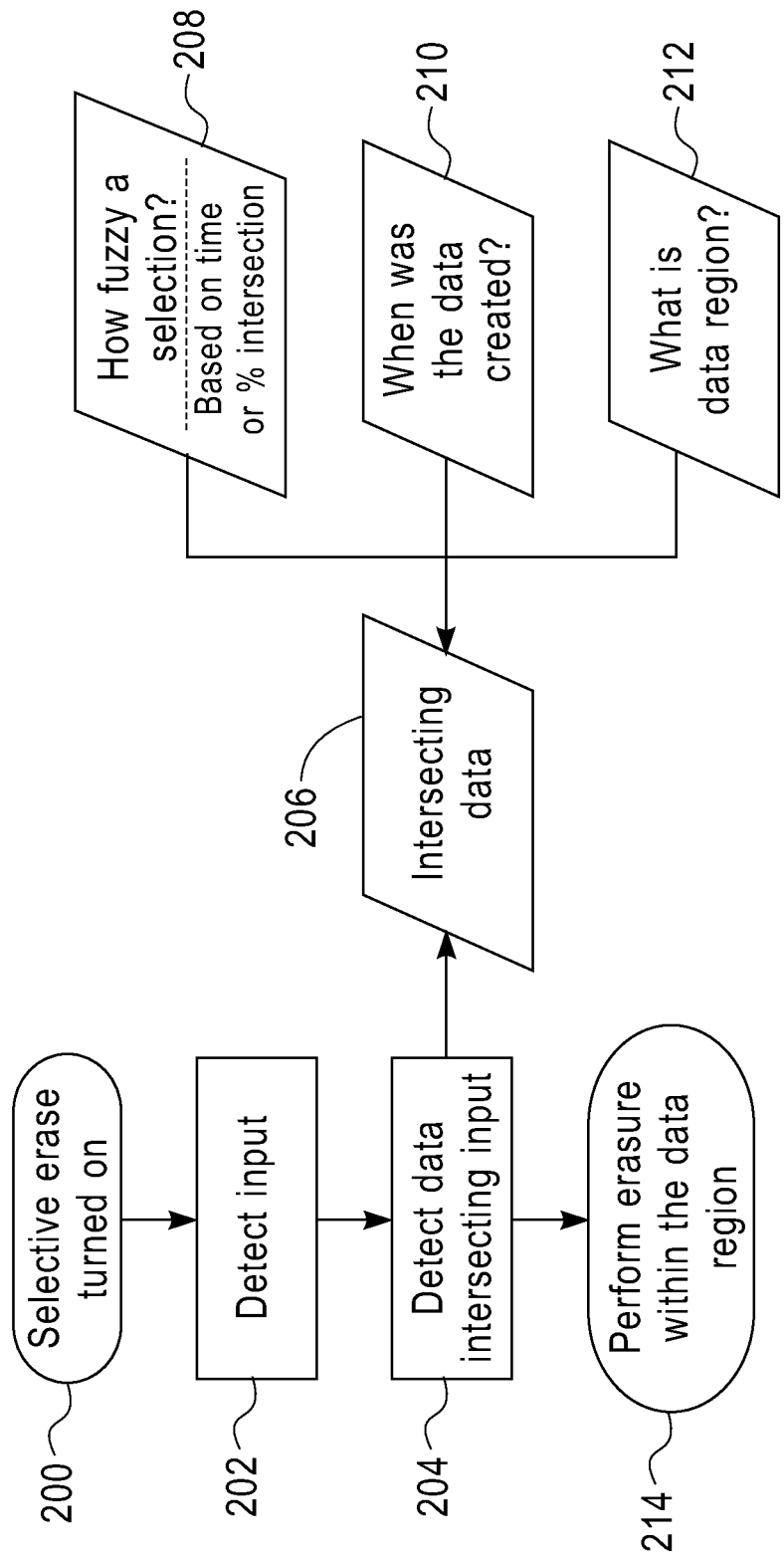
FIG. 3 is a flow diagram illustrating embodiments herein.

As mentioned above, conventional non-keyboard based erasers fail to selectively erase strokes, especially when different brushstrokes overlap. In view of such limitations, the systems and methods herein provide selective erasure of data based on contiguous action and event history. With systems and methods herein, pixels can be managed in virtual layers allowing selecting removal without affecting surrounding or intersecting pixels. The systems and methods herein can be used in conjunction with other techniques for additional performance. Thus, the systems and methods herein record when the graphical mark was made (point in time and duration) and using this information allows the user to selectively erase or remove data while leaving other potentially overlapping data. Unlike the historical paintbrush that paints historical information in selective areas, the systems and methods herein focus on selective removal of stroke, not the replacement of current pixels with other historical pixels.

For convenience, user inputs made through devices such as a touch-sensitive screen, a computer mouse, a touchpad, a stylus, a trackball, a joystick, and/or another other device that records user hand, finger, eye, or extremity movements are often referred to herein as non-keyboard inputs. Similarly, the contrasting pixels displayed on the graphic user interface in response to such user inputs are often referred to herein as graphical marks, brushstrokes, electronic pen/pencil marks, etc. Those ordinarily skilled in the art would understand that such terminology is only used as a shorthand convenience herein to improve the readability of this document, and that the systems and methods described herein are not limited to any specific graphic user interface, input device, display format, software programs, etc., but instead are applicable to all such devices whether currently known or developed in the future.

For example, one embodiment uses a tablet style interface running a sketchbook application allowing users to write or draw using their finger or stylus. Selective erasure can be invoked through a button, check box, gesture, stylus specific capability or other input switch. Once the erasure activity begins (in some instances, the user actually touches the input device with their finger or other body part to erase) the prior input (pixels, curves, etc.) is erased selectively based on when they were made, without affecting data not initially touched by the input. For example, the systems and methods herein allow for selective letter or word erasure of handwriting that overlaps, without affecting overlapping text.

In one example shown in FIGS. 1 and 2, a series of brushstrokes 100 have been entered by a user using non-keyboard input to record sentences; however, those ordinarily skilled in the art would understand that the same form of non-keyboard input could be used to sketch a drawing, or create other artwork. As shown in FIG. 1, various portions of the brushstrokes overlap 102, 104. More specifically, consider the words "silly" and "professional" underneath. The tail of the "y" intersects with the height of the "1" as shown by item 104 in FIG. 1.

As shown in FIG. 2, the non-keyboard erasure input has also been used to perform an erasure functions on areas 110, 112, 114, and 116 to remove portions of the brushstrokes 100. With the systems and methods herein, the erasure area 114 erasing portions of the word professional removes the "1" while leaving the tail of the "y," even though the two brushstrokes originally overlapped. To the contrary, conventional systems would erase portions of the "y" when a racing the top of the letter "1."

While FIGS. 1 and 2 illustrate brushstrokes, other embodiments herein can be used with vector based drawing tools. Irrespective of the different software application, the systems and methods herein still allow the user to selectively erase or modify shapes based on interaction. The systems and methods herein can automatically select different vectors for erasure based on direct selection and ignores all other vector elements. In this situation, erasure simply alters the vector shape to match a new vector.

FIG. 3 is a flow diagram illustrating various aspects of systems and methods herein. More specifically, item 200 indicates that the user has turned the selective erasure feature on. Next, in item 202, the systems and methods herein detect user input for performing various erasure operations. In item 204, the systems and methods herein detect intersecting input data of the location of the erasure. For example, in item 204, the erasure regions is identified by the pointer location (x, y point or brush shape) and such is used to detect which data intersects that point or region.

More specifically, item 206 in FIG. 3 represents more details regarding the intersecting data. As shown in item 208, the user is provided options to select or preselect the "accuracy" or fuzziness using exact location or region (using a time window or percentage of intersection) to provide a greater control over what will be considered intersecting data 206. More specifically, the time window defines contiguous marks and the percentage of intersection describes which of more than one overlapping stroke is the "primary" selection. Similarly, in item 210, the methods and systems herein consider when the data was created as a control over the intersecting data 206. As represented by item 212, the methods and systems herein define the primary data region according to the intersecting data 206. Once the intersecting input data of the location of the erasure is identified, the methods and systems herein perform the erasure in item 214, which optionally leverages a tool's native capability.

Figure 4:
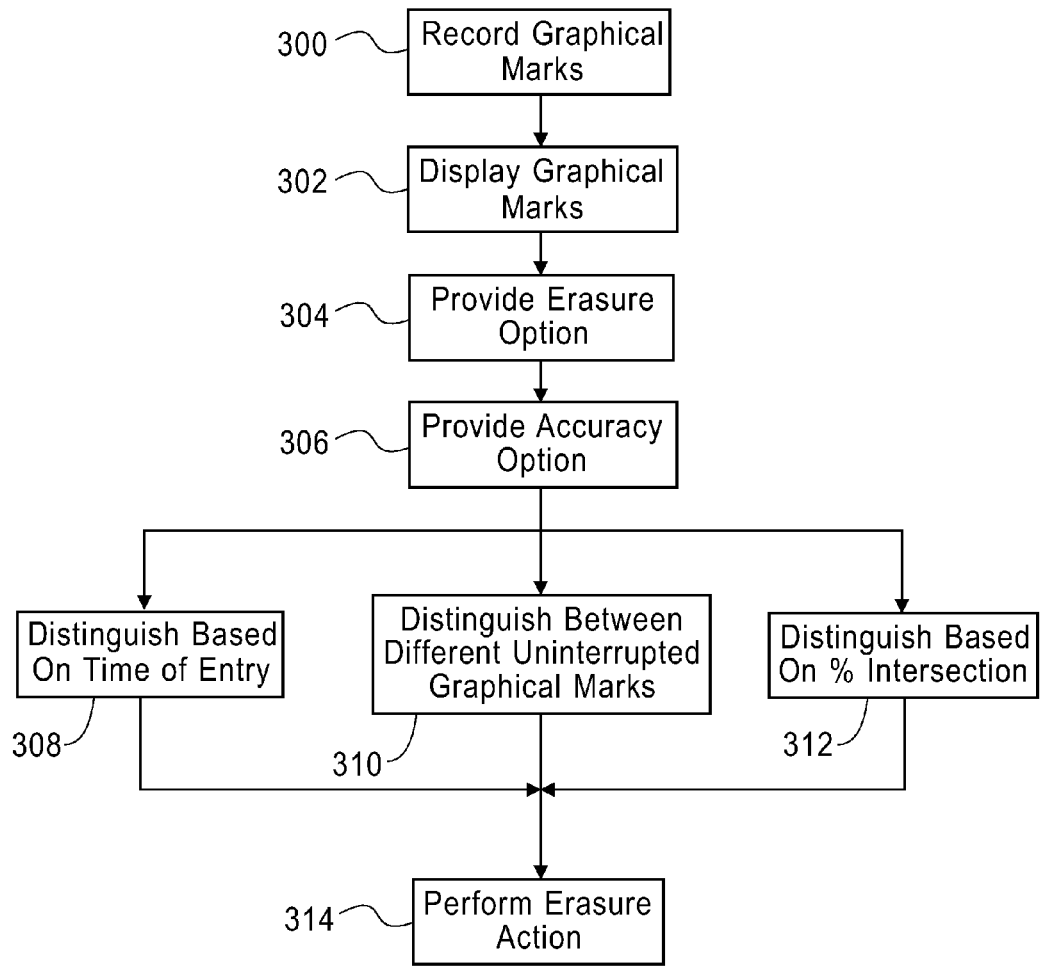
FIG. 4 is a flow diagram illustrating embodiments herein.

FIG. 4 is a more generalized flow diagram of an exemplary method herein that begins by recording graphical marks input through non-keyboard input into a graphic user interface of a computerized device in item 300. The recording process in item 300 includes recording different input times when the graphical marks are input, and recording whether the graphic marks are (arbitrarily named) "uninterrupted graphic marks" using a processor of the computerized device.

An uninterrupted graphical mark is one of the graphical marks that is input through a discrete and continuous user input action, and is made without the user pausing such discrete and continuous user input action. In one example of an uninterrupted graphical mark, a user may apply (contact, touch, connect, etc.) their finger against a touchscreen (or push a button on a mouse or joystick), move their finger across the touchscreen without losing contact with the touchscreen (or without releasing the button), and then remove their finger (lose contact or disconnect, or release the button) from the touchscreen to create a discrete straight or curved line. More specifically, the point where the user initially contacted the touchscreen is the beginning of the line and the point where the user last contacted the touchscreen is the end of the line that is created by the user motion across the touchscreen. Those ordinarily skilled in the art would understand that similar uninterrupted graphical marks can be created using any of the previously mentioned non-keyboard input devices. Some letters, characters, or illustrations are made up of two or more of such discrete straight or curved lines, and such graphical marks sometimes overlap.

The methods and systems herein can consider each such uninterrupted graphical mark as an individual unit (identified by a unique time or counter stamp) that can be erased selectively without affecting other uninterrupted graphical marks (even if such overlap each other). Thus, during the recording of the graphical marks in item 300, pauses in user input actions (when the user stops movement or loses contact with the input device) can define boundaries of the different input times and boundaries as to what distinguishes one uninterrupted graphical mark from another uninterrupted graphical mark. Therefore, each uninterrupted graphical mark can be recorded with it's own date/time code or it's own count code. Alternatively, a continuous running time can be used to record when each individual pixel is altered by the non-keyboard input of the user (and such pixels can arbitrarily be grouped into previously established discrete preset time periods to define different graphical marks or units).

In item 302, the method also displays the graphical marks and, in item 304, provides an erasure option on the graphic user interface. Further, item 306 allows the user to select an accuracy level at which the erasure option will distinguish between different graphical marks using, for example, well-known fuzzy logic methodologies. In item 306, the user can also establish the preset time intervals (seconds, minutes, hours, etc.) that will distinguish one graphical mark (or groups of graphical marks) from other graphical mark(s), if a continuous running time is used to record when each individual pixel is altered.

The erasure option 304 allows the user to distinguish which of the graphical marks are erased based on the different input times as represented by item 308. For example, if discrete uninterrupted graphical marks are recorded with an associated unique date/time in item 300, the systems and methods herein can erase at least a portion of a first graphical mark made within a single input time, without erasing any portions of second graphical marks made at a different input time, irrespective of spatial overlap (as displayed on the graphic user interface) between the first graphical mark and the second graphical mark. Further, the methods and systems herein distinguish between erasing the graphic marks input at different input times, irrespective of the order in which the graphic marks are input and recorded.

Also, the erasure option 304 allows the user to distinguish which of the graphical marks are erased by distinguishing between erasure of different ones of the uninterrupted graphic marks, as represented by item 310. Therefore, the processing in item 310 erases at least a portion of a first uninterrupted graphical mark, without erasing any portions of second uninterrupted graphical marks, irrespective of spatial overlap (as displayed on the graphic user interface) between the first uninterrupted graphical mark and the uninterrupted second graphical marks. Again, this can be performed, irrespective of the time-based order in which the uninterrupted graphic marks are input and recorded.

The erasure option 304 also allows the user to distinguish which of the graphical marks are erased based on the percentage of intersection, as represented by item 312. More specifically, the percentage of intersection describes which of more than one overlapping stroke is the "primary" selection. Finally, in item 314, the methods and systems herein perform the erasure action according to the non-keyboard input erasure movements of the user.

Therefore, in items 308-312, once a user begins to erase a portion of the first graphical mark (using the non-keyboard input) the movements of the user on the non-keyboard input can be interpreted to only apply to the first (primary) graphical mark (the primary selection). Therefore, even if some of the user movements on the non-keyboard input move over pixels of the second graphical mark, or portions of the first and second graphical marks overlap, such movements will not affect the second graphical mark and will only affect the first graphical mark. Further, such movements can be limited to the first graphical mark, even if it was recorded later in time than the second graphical mark.

The extent to which the erasure actions will affect only the first graphical mark are controlled by the accuracy limits input by the user in item 306. For example, if an accuracy limit of 80% is provided in the accuracy option 306, so long as 80% of the non-keyboard input erasure movements intersects pixels of the first graphical mark, erasure will be limited to the first graphical mark; however, in another example, if 50% of the non-keyboard input erasure movements intersects the first graphical mark and 50% of the non-keyboard input erasure of movements intersects the second graphical mark, both the first and second graphical marks could be erased according to the non-keyboard input movements. One ordinarily skilled in the art would understand that these are merely examples of how the accuracy options could be established and many other scales and conceptual accuracy descriptions could be provided to the user (other than percentages) in order to receive a desired accuracy measure from the user.

In alternative embodiments (and depending upon user accuracy preferences set in the accuracy option in item 306) strict rules can be established so that marks are only erased in the order in which they are input, again based upon the time that is recorded for each input in item 300. Further, the decision of which graphical mark is the primary graphical mark to erase can be based solely upon which graphical mark intersects the greatest percentage of non-keyboard input erasure movements.

Additionally, a minimum percentage can be established in item 306 to require that the non-keyboard input erasure movements of the user intersects at least such a minimum percentage of the area of a graphical mark in order to have any portion of the graphical mark erased. Therefore, in such additional embodiments, discrete graphical marks can only be erased if 25%, 50%, 80%, or 100% of the graphical mark intersects the non-keyboard input erasure movements. In some embodiments, once the minimum percentage of non-keyboard input erasure movements intersect the area of a graphical mark, either the entire graphical mark unit can be immediately erased, or only the portions of the graphical mark that intersect the non-keyboard input erasure movements can be erased.

As will be appreciated by one skilled in the art, aspects of the systems and methods herein may be embodied as a system, method or computer program product. Accordingly, aspects of the present disclosure may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present disclosure may take the form of a computer program product embodied in one or more computer readable medium (s) having computer readable program code embodied thereon.

Any combination of one or more computer readable non-transitory medium(s) may be utilized. The computer readable medium may be a computer readable signal medium or a computer readable storage medium. The non-transitory computer storage medium stores instructions, and a processor executes the instructions to perform the methods described herein. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present disclosure may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present disclosure are described below with reference to flowchart illustrations and/or block diagrams of methods, apparatus (systems) and computer program products according to embodiments herein. It will be understood that each block of the flowchart illustrations and/or two-dimensional block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

Figure 5:
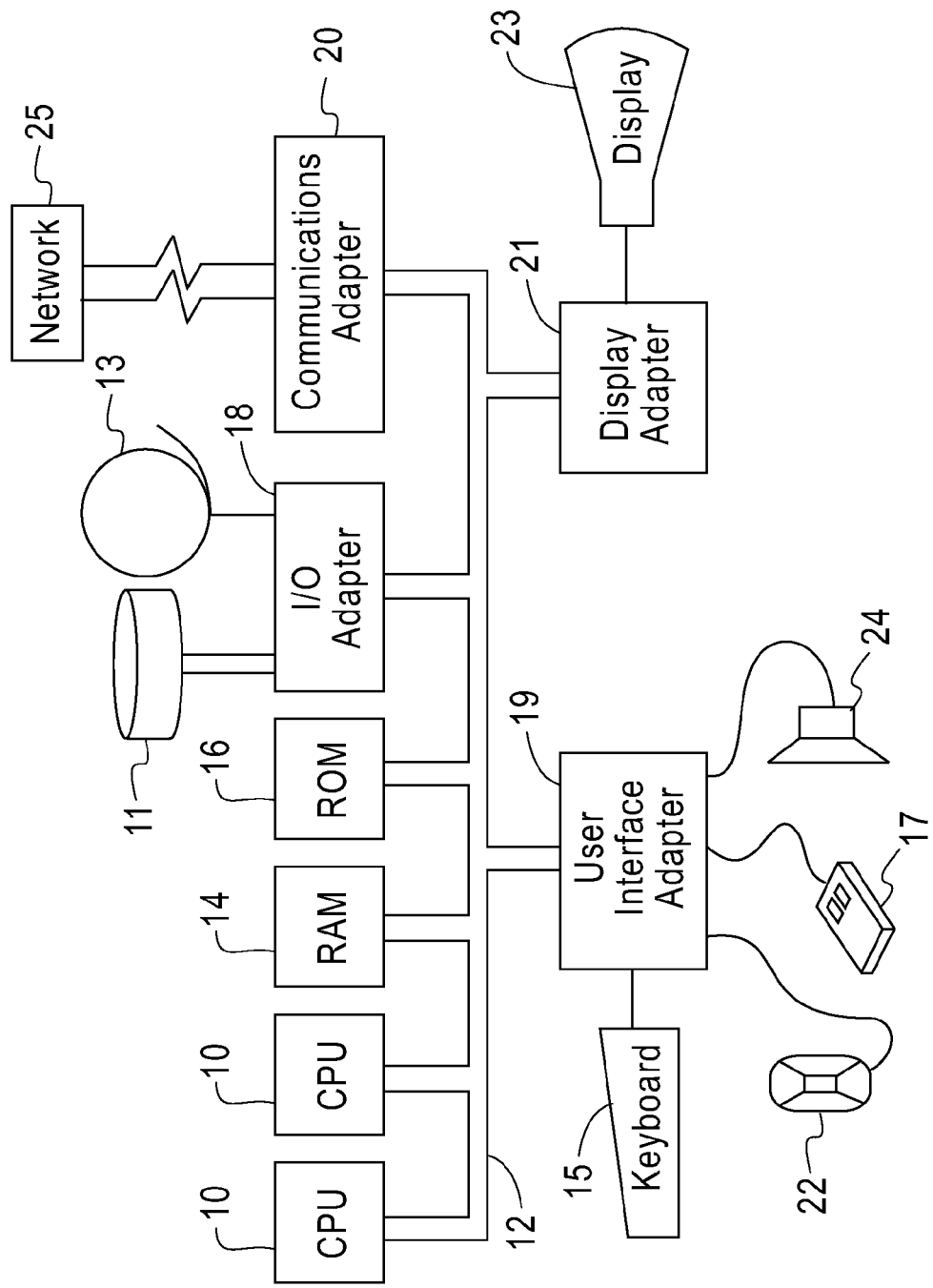
FIG. 5 is a schematic diagram of a hardware system according to embodiments herein.

A representative hardware environment for practicing the embodiments herein is depicted in FIG. 5. This schematic drawing illustrates a hardware configuration of an information handling/computer system in accordance with the embodiments herein. The system comprises at least one processor or central processing unit (CPU) 10. The CPUs 10 are interconnected via system bus 12 to various devices such as a random access memory (RAM) 14, read-only memory (ROM) 16, and an input/output (I/O) adapter 18. The I/O adapter 18 can connect to peripheral devices, such as disk units 11 and tape drives 13, or other program storage devices that are readable by the system. The system can read the inventive instructions on the program storage devices and follow these instructions to execute the methodology of the embodiments herein. The system further includes a user interface adapter 19 that connects a keyboard 15, mouse 17, speaker 24, microphone 22, and/or other user interface devices such as a touch screen device (not shown) to the bus 12 to gather user input. Additionally, a communication adapter 20 connects the bus 12 to a data processing network 25, and a display adapter 21 connects the bus 12 to a display device 23 which may be embodied as an output device such as a monitor, printer, or transmitter, for example.

A computerized apparatus embodiment herein thus includes a graphic user interface 19 recording graphical marks and a processor 10 operatively connected to the graphic user interface 19. The graphical marks comprise input other than keyboard button input. The processor 10 records different input times when the graphical marks are input and records whether the graphic marks are uninterrupted graphic marks. Again, an uninterrupted graphical mark is one of the graphical marks that is input through a discrete and continuous user input action and is made without the user pausing the discrete and continuous user input action. The graphic user interface 19 displays the graphical marks and provides an erasure option. The erasure option allows a user to distinguish which of the graphical marks are erased based on the different input times and/or by distinguishing between erasure of different ones of the uninterrupted graphic marks.

The flowchart and block diagrams in the Figures illustrate the architecture, functionality, and operation of possible implementations of systems, methods and computer program products according to various embodiments herein. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

Deployment types include loading directly in the client, server and proxy computers via loading a storage medium such as a CD, DVD, etc. The process software may also be automatically or semi-automatically deployed into a computer system by sending the process software to a central server or a group of central servers. The process software is then downloaded into the client computers that will execute the process software. The process software is sent directly to the client system via e-mail. The process software is then either detached to a directory or loaded into a directory by a button on the e-mail that executes a program that detaches the process software into a directory. Send the process software directly to a directory on the client computer hard drive. When there are proxy servers, the process will, select the proxy server code, determine on which computers to place the proxy servers' code, transmit the proxy server code, and then install the proxy server code on the proxy computer. The process software will be transmitted to the proxy server then stored on the proxy server.

While it is understood that the process software may be deployed by manually loading directly in the client, server and proxy computers via loading a storage medium such as a CD, DVD, etc., the process software may also be automatically or semi-automatically deployed into a computer system by sending the process software to a central server or a group of central servers. The process software is then downloaded into the client computers that will execute the process software. Alternatively the process software is sent directly to the client system via e-mail. The process software is then either detached to a directory or loaded into a directory by a button on the e-mail that executes a program that detaches the process software into a directory. Another alternative is to send the process software directly to a directory on the client computer hard drive. When there are proxy servers, the process will, select the proxy server code, determine on which computers to place the proxy servers' code, transmit the proxy server code, then install the proxy server code on the proxy computer. The process software will be transmitted to the proxy server then stored on the proxy server.

Figure 6:
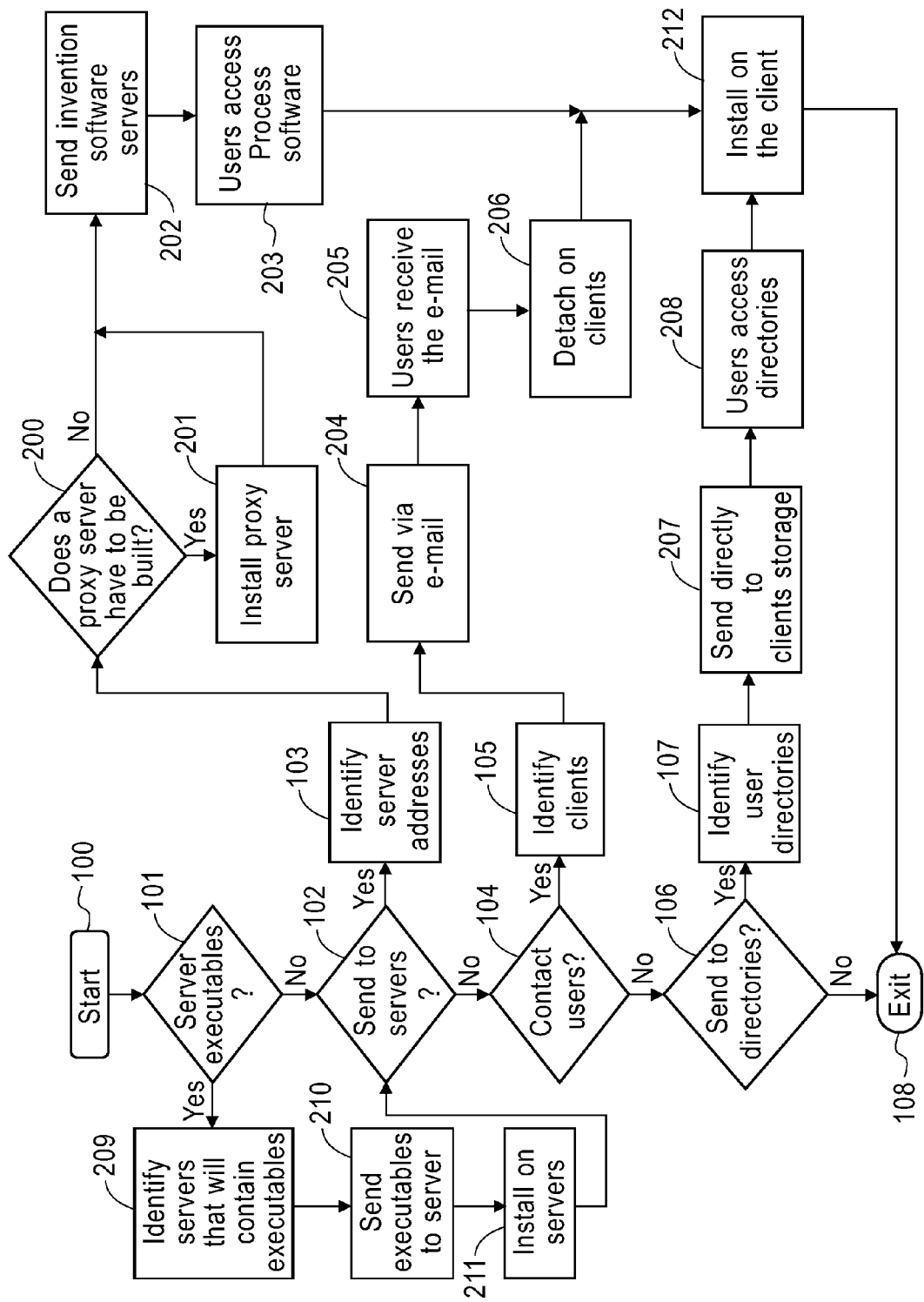
FIG. 6 is a schematic diagram of a deployment system according to embodiments herein.

In FIG. 6, Step 100 begins the deployment of the process software. The first thing is to determine if there are any programs that will reside on a server or servers when the process software is executed 101. If this is the case then the servers that will contain the executables are identified 209.

The process software for the server or servers is transferred directly to the servers' storage via FTP or some other protocol or by copying through the use of a shared file system 210. The process software is then installed on the servers 211.

Next, a determination is made on whether the process software is be deployed by having users access the process software on a server or servers 102. If the users are to access the process software on servers then the server addresses that will store the process software are identified 103.

A determination is made if a proxy server is to be built 200 to store the process software. A proxy server is a server that sits between a client application, such as a Web browser, and a real server. It intercepts all requests to the real server to see if it can fulfill the requests itself. If not, it forwards the request to the real server. The two primary benefits of a proxy server are to improve performance and to filter requests. If a proxy server is required then the proxy server is installed 201. The process software is sent to the servers either via a protocol such as FTP or it is copied directly from the source files to the server files via file sharing 202. Another embodiment would be to send a transaction to the servers that contained the process software and have the server process the transaction, then receive and copy the process software to the server's file system. Once the process software is stored at the servers, the users via their client computers, then access the process software on the servers and copy to their client computers file systems 203. Another embodiment is to have the servers automatically copy the process software to each client and then run the installation program for the process software at each client computer. The user executes the program that installs the process software on his client computer 212 then exits the process 108.

In step 104 a determination is made whether the process software is to be deployed by sending the process software to users via e-mail. The set of users where the process software will be deployed are identified together with the addresses of the user client computers 105. The process software is sent via e-mail 204 to each of the users' client computers. The users then receive the e-mail 205 and then detach the process software from the e-mail to a directory on their client computers 206. The user executes the program that installs the process software on his client computer 212 then exits the process 108.

Lastly, a determination is made on whether the process software will be sent directly to user directories on their client computers 106. If so, the user directories are identified 107. The process software is transferred directly to the user's client computer directory 207. This can be done in several ways such as but not limited to sharing of the file system directories and then copying from the sender's file system to the recipient user's file system or alternatively using a transfer protocol such as File Transfer Protocol (FTP). The users access the directories on their client file systems in preparation for installing the process software 208. The user executes the program that installs the process software on his client computer 212 then exits the process 108.

The process software is integrated into a client, server and network environment by providing for the process software to coexist with applications, operating systems and network operating systems software and then installing the process software on the clients and servers in the environment where the process software will function.

The first step is to identify any software on the clients and servers including the network operating system where the process software will be deployed that are required by the process software or that work in conjunction with the process software. This includes the network operating system that is software that enhances a basic operating system by adding networking features.

Next, the software applications and version numbers will be identified and compared to the list of software applications and version numbers that have been tested to work with the process software. Those software applications that are missing or that do not match the correct version will be upgraded with the correct version numbers. Program instructions that pass parameters from the process software to the software applications will be checked to ensure the parameter lists matches the parameter lists required by the process software. Conversely parameters passed by the software applications to the process software will be checked to ensure the parameters match the parameters required by the process software. The client and server operating systems including the network operating systems will be identified and compared to the list of operating systems, version numbers and network software that have been tested to work with the process software. Those operating systems, version numbers and network software that do not match the list of tested operating systems and version numbers will be upgraded on the clients and servers to the required level.

After ensuring that the software, where the process software is to be deployed, is at the correct version level that has been tested to work with the process software, the integration is completed by installing the process software on the clients and servers.

Figure 7:
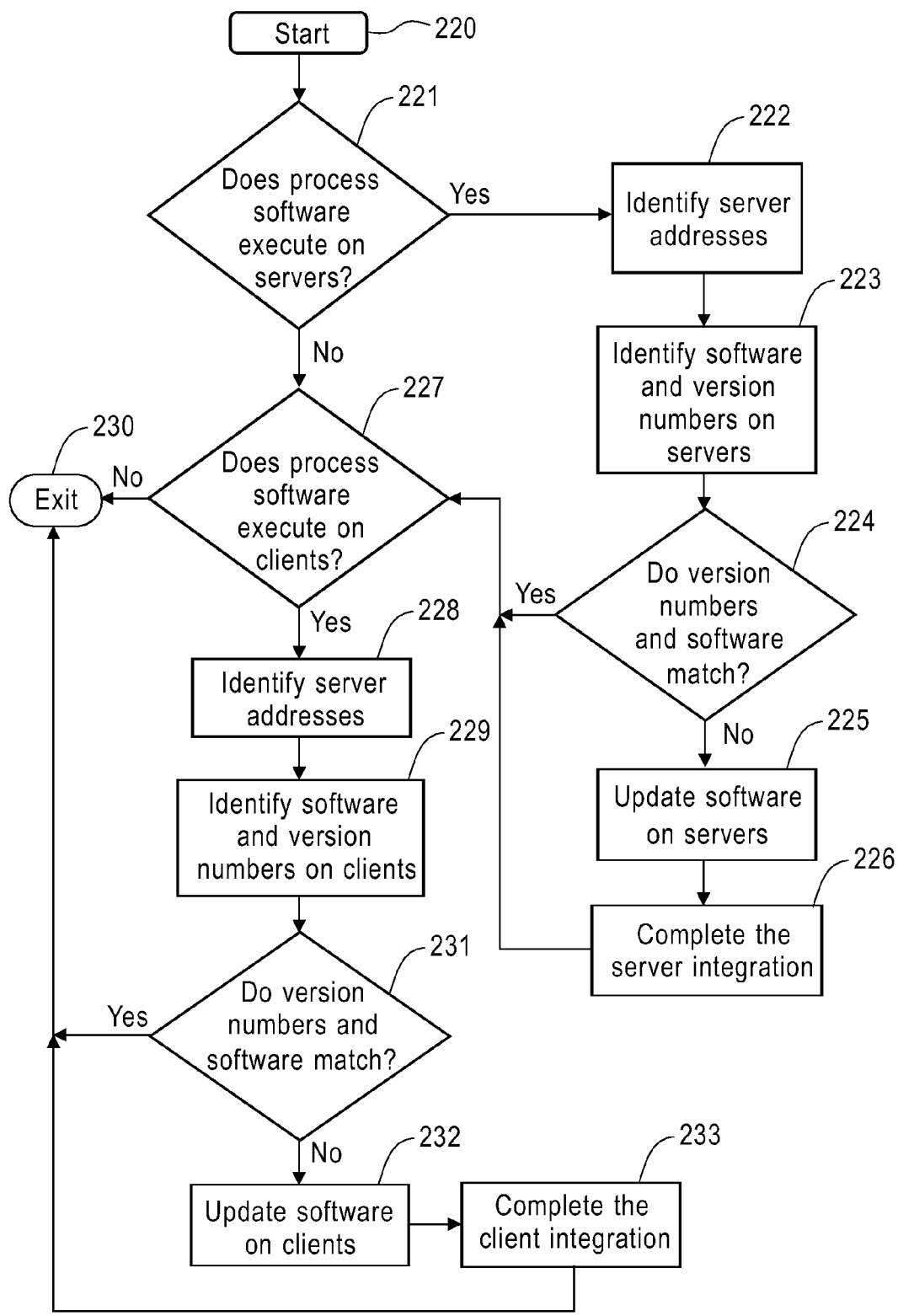
FIG. 7 is a schematic diagram of an integration system according to embodiments herein.

In FIG. 7, Step 220 begins the integration of the process software. The first thing is to determine if there are any process software programs that will execute on a server or servers 221. If this is not the case, then integration proceeds to 227. If this is the case, then the server addresses are identified 222. The servers are checked to see if they contain software that includes the operating system (OS), applications, and network operating systems (NOS), together with their version numbers, that have been tested with the process software 223. The servers are also checked to determine if there is any missing software that is required by the process software 223.

A determination is made if the version numbers match the version numbers of OS, applications and NOS that have been tested with the process software 224. If all of the versions match and there is no missing required software the integration continues in 227.

If one or more of the version numbers do not match, then the unmatched versions are updated on the server or servers with the correct versions 225. Additionally if there is missing required software, then it is updated on the server or servers 225. The server integration is completed by installing the process software 226.

Step 227 which follows either 221, 224 or 226 determines if there are any programs of the process software that will execute on the clients. If no process software programs execute on the clients the integration proceeds to 230 and exits. If this not the case, then the client addresses are identified 228.

The clients are checked to see if they contain software that includes the operating system (OS), applications, and network operating systems (NOS), together with their version numbers, that have been tested with the process software 229. The clients are also checked to determine if there is any missing software that is required by the process software 229.

A determination is made as to whether the version numbers match the version numbers of OS, applications and NOS that have been tested with the process software 231. If all of the versions match and there is no missing required software, then the integration proceeds to 230 and exits.

If one or more of the version numbers do not match, then the unmatched versions are updated on the clients with the correct versions 232. In addition, if there is missing required software then it is updated on the clients 232. The client integration is completed by installing the process software on the clients 233. The integration proceeds to 230 and exits.

The process software can be stored on a shared file system accessible from one or more servers. The process software is executed via transactions that contain data and server processing requests that use CPU units on the accessed server. CPU units are units of time such as minutes, seconds, hours on the central processor of the server. Additionally the assessed server may make requests of other servers that require CPU units. CPU units are an example that represents but one measurement of use. Other measurements of use include but are not limited to network bandwidth, memory usage, storage usage, packet transfers, complete transactions etc. When multiple customers use the same process software application, their transactions are differentiated by the parameters included in the transactions that identify the unique customer and the type of service for that customer. All of the CPU units and other measurements of use that are used for the services for each customer are recorded. When the number of transactions to any one server reaches a number that begins to effect the performance of that server, other servers are accessed to increase the capacity and to share the workload. Likewise when other measurements of use such as network bandwidth, memory usage, storage usage, etc. approach a capacity so as to effect performance, additional network bandwidth, memory usage, storage etc. are added to share the workload. The measurements of use used for each service and customer are sent to a collecting server that sums the measurements of use for each customer for each service that was processed anywhere in the network of servers that provide the shared execution of the process software. The summed measurements of use units are periodically multiplied by unit costs and the resulting total process software application service costs are alternatively sent to the customer and or indicated on a web site accessed by the customer which then remits payment to the service provider. In another embodiment, the service provider requests payment directly from a customer account at a banking or financial institution. In another embodiment, if the service provider is also a customer of the customer that uses the process software application, the payment owed to the service provider is reconciled to the payment owed by the service provider to minimize the transfer of payments.

The process software is shared, simultaneously serving multiple customers in a flexible, automated fashion. It is standardized, requiring little customization and it is scalable, providing capacity on demand in a pay-as-you-go model.

The process software can be stored on a shared file system accessible from one or more servers. The process software is executed via transactions that contain data and server processing requests that use CPU units on the accessed server. CPU units are units of time such as minutes, seconds, hours on the central processor of the server. Additionally the assessed server may make requests of other servers that require CPU units. CPU units are an example that represents but one measurement of use. Other measurements of use include but are not limited to network bandwidth, memory usage, storage usage, packet transfers, complete transactions etc.

When multiple customers use the same process software application, their transactions are differentiated by the parameters included in the transactions that identify the unique customer and the type of service for that customer. All of the CPU units and other measurements of use that are used for the services for each customer are recorded. When the number of transactions to any one server reaches a number that begins to effect the performance of that server, other servers are accessed to increase the capacity and to share the workload. Likewise when other measurements of use such as network bandwidth, memory usage, storage usage, etc. approach a capacity so as to effect performance, additional network bandwidth, memory usage, storage etc. are added to share the workload.

The measurements of use used for each service and customer are sent to a collecting server that sums the measurements of use for each customer for each service that was processed anywhere in the network of servers that provide the shared execution of the process software. The summed measurements of use units are periodically multiplied by unit costs and the resulting total process software application service costs are alternatively sent to the customer and or indicated on a web site accessed by the customer which then remits payment to the service provider.

In another embodiment, the service provider requests payment directly from a customer account at a banking or financial institution.

In another embodiment, if the service provider is also a customer of the customer that uses the process software application, the payment owed to the service provider is reconciled to the payment owed by the service provider to minimize the transfer of payments.

Figure 8:
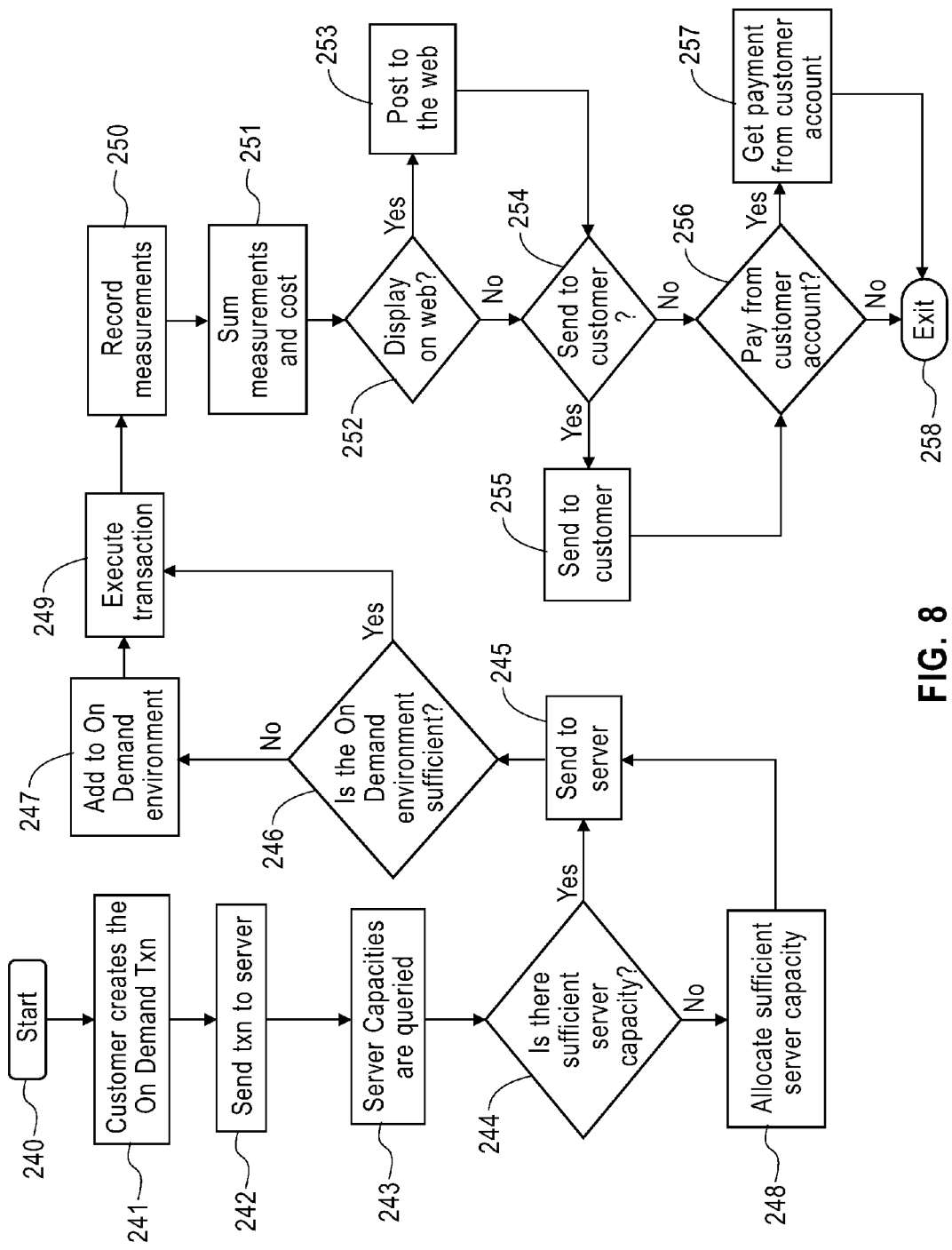
FIG. 8 is a schematic diagram of an on demand system according to embodiments herein.

In FIG. 8, Step 240 begins the On Demand process. A transaction is created that contains the unique customer identification, the requested service type and any service parameters that further specify the type of service 241. The transaction is then sent to the main server 242. In an On Demand environment the main server can initially be the only server, then as capacity is consumed other servers are added to the On Demand environment.

The server central processing unit (CPU) capacities in the On Demand environment are queried 243. The CPU requirement of the transaction is estimated, then the servers available CPU capacity in the On Demand environment are compared to the transaction CPU requirement to see if there is sufficient CPU available capacity in any server to process the transaction 244. If there is not sufficient server CPU available capacity, then additional server CPU capacity is allocated to process the transaction 248. If there was already sufficient Available CPU capacity then the transaction is sent to a selected server 245.

Before executing the transaction, a check is made of the remaining On Demand environment to determine if the environment has sufficient available capacity for processing the transaction. This environment capacity consists of such things as but not limited to network bandwidth, processor memory, storage etc. 246. If there is not sufficient available capacity, then capacity will be added to the On Demand environment 247. Next the required software to process the transaction is accessed, loaded into memory, then the transaction is executed 249.

The usage measurements are recorded 250. The usage measurements consist of the portions of those functions in the On Demand environment that are used to process the transaction. The usage of such functions is, but not limited to, network bandwidth, processor memory, storage and CPU cycles are what is recorded. The usage measurements are summed, multiplied by unit costs and then recorded as a charge to the requesting customer 251. If the customer has requested that the On Demand costs be posted to a web site 252 then they are posted 253.

If the customer has requested that the On Demand costs be sent via e-mail to a customer address 254 then they are sent 255. If the customer has requested that the On Demand costs be paid directly from a customer account 256 then payment is received directly from the customer account 257. The last step is to exit the On Demand process 258.

The process software may be deployed, accessed and executed through the use of a virtual private network (VPN), which is any combination of technologies that can be used to secure a connection through an otherwise unsecured or untrusted network. The use of VPNs is to improve security and for reduced operational costs. The VPN makes use of a public network, usually the Internet, to connect remote sites or users together. Instead of using a dedicated, real-world connection such as leased line, the VPN uses "virtual" connections routed through the Internet from the company's private network to the remote site or employee.

The process software may be deployed, accessed and executed through either a remote-access or a site-to-site VPN. When using the remote-access VPNs the process software is deployed, accessed and executed via the secure, encrypted connections between a company's private network and remote users through a third-party service provider. The enterprise service provider (ESP) sets a network access server (NAS) and provides the remote users with desktop client software for their computers. The telecommuters can then dial a toll-free number or attach directly via a cable or DSL modem to reach the NAS and use their VPN client software to access the corporate network and to access, download and execute the process software.

When using the site-to-site VPN, the process software is deployed, accessed and executed through the use of dedicated equipment and large-scale encryption that are used to connect a companies multiple fixed sites over a public network such as the Internet.

The process software is transported over the VPN via tunneling which is the process the of placing an entire packet within another packet and sending it over a network. The protocol of the outer packet is understood by the network and both points, called tunnel interfaces, where the packet enters and exits the network.

Figure 9:
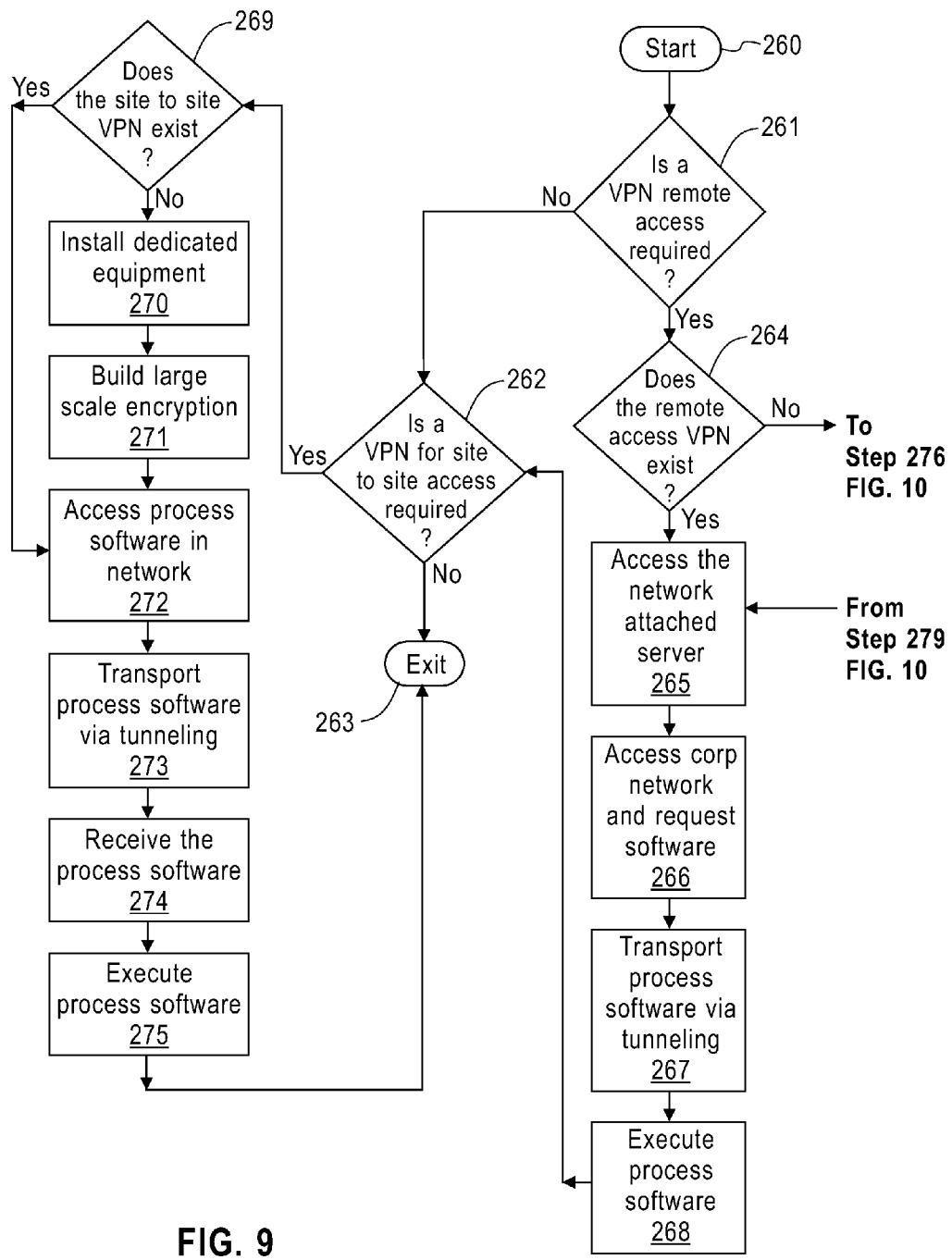
FIG. 9 is a schematic diagram of a virtual private network system according to embodiments herein.
Figure 10:
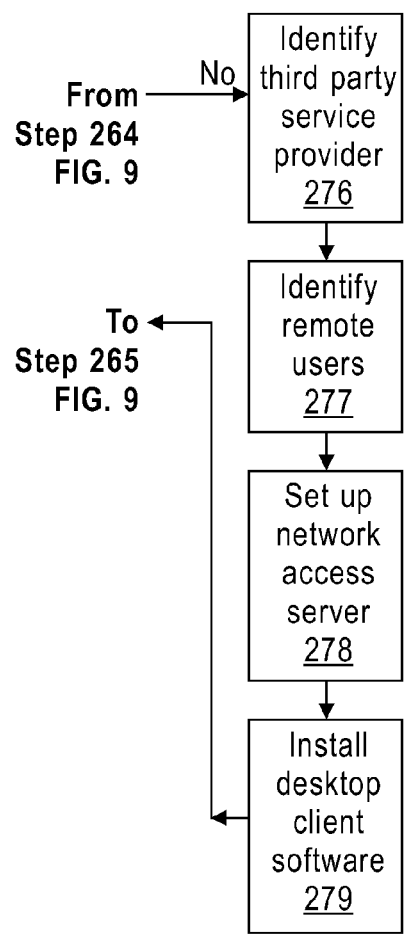
FIG. 10 is a schematic diagram of a virtual private network system according to embodiments herein.

In FIGS. 9 and 10, Step 260 begins the Virtual Private Network (VPN) process. A determination is made to see if a VPN for remote access is required 261. If it is not required, then proceed to 262. If it is required, then determine if the remote access VPN exists 264.

If it does exist, then proceed to 265. Otherwise identify the third party provider that will provide the secure, encrypted connections between the company's private network and the company's remote users 276. The company's remote users are identified 277. The third party provider then sets up a network access server (NAS) 278 that allows the remote users to dial a toll free number or attach directly via a cable or DSL modem to access, download and install the desktop client software for the remote-access VPN 279.

After the remote access VPN has been built or if it has been previously installed, the remote users can then access the process software by dialing into the NAS or attaching directly via a cable or DSL modem into the NAS 265. This allows entry into the corporate network where the process software is accessed 266. The process software is transported to the remote user's desktop over the network via tunneling. That is the process software is divided into packets and each packet including the data and protocol is placed within another packet 267. When the process software arrives at the remote user's desktop, it is removed from the packets, reconstituted and then is executed on the remote users desktop 268.

A determination is made to see if a VPN for site to site access is required 262. If it is not required, then proceed to exit the process 263. Otherwise, determine if the site to site VPN exists 269. If it does exist, then proceed to 272. Otherwise, install the dedicated equipment required to establish a site to site VPN 270. Then build the large scale encryption into the VPN 271.

After the site to site VPN has been built or if it has been previously established, the users access the process software via the VPN 272. The process software is transported to the site users over the network via tunneling 273. That is the process software is divided into packets and each packet including the data and protocol is placed within another packet 274. When the process software arrives at the remote user's desktop, it is removed from the packets, reconstituted and is executed on the site users desktop 275. Proceed to exit the process 263.

The terminology used herein is for the purpose of describing particular embodiments only and is not intended to be limiting of this disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The descriptions of the various embodiments herein have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A method comprising:

recording graphical marks input through a graphic user interface of a computerized device, said graphical marks comprising input other than keyboard button input, said recording including recording different input times when different ones of said graphical marks are input to distinguish said graphical marks from one another by said different input times, using a processor of said computerized device;

displaying said graphical marks on said graphic user interface; and providing an erasure option executed by non-keyboard erasure movements on said graphic user interface, said erasure option allowing a user to distinguish which of overlapping ones of said graphical marks are erased based on said non-keyboard erasure movements and said different input times, irrespective of spatial overlap between said graphical marks as displayed on said graphic user interface.

2. The method according to claim 1, during said recording of said graphical marks, pauses in user input actions defining boundaries of said different input times.

3. The method according to claim 1, said erasure option erasing at least a portion of a first graphical mark made within a single one of said different input times, without erasing any portions of second graphical marks made at different ones of said different input times, irrespective of spatial overlap between said first graphical mark and said second graphical marks as displayed on said graphic user interface.

4. The method according to claim 1, said erasure option distinguishing between erasing said graphic marks input at said different input times, irrespective of an order in which said graphic marks are input and recorded.

5. The method according to claim 1, said erasure option receiving user input comprising input other than keyboard button input.

6. The method according to claim 1, said graphical marks and erasure input executing said erasure option being input through at least one of: a touch-sensitive screen; a computer mouse; a touchpad; a stylus; a trackball; a joystick; and a device that records user movements.

7. A method comprising:
recording graphical marks input through a graphic user interface of a computerized device, said graphical marks comprising input other than keyboard button input, said recording including identifying whether said graphic marks are uninterrupted graphic marks distinguished from one another, using a processor of said computerized device, an uninterrupted graphical mark being distinguished from other ones of said uninterrupted graphical marks by being one of said graphical marks input through a discrete and continuous user input action and being made without pausing said discrete and continuous user input action;
displaying said graphical marks on said graphic user interface; and
providing an erasure option executed by non-keyboard erasure movements on said graphic user interface,
said erasure option allowing a user to distinguish which of overlapping ones of said uninterrupted graphical marks are erased based on said non-keyboard erasure movements and said identifying whether said graphic marks are uninterrupted graphic marks distinguished from one another, irrespective of spatial overlap between said uninterrupted graphical marks as displayed on said graphic user interface.

8. The method according to claim 7, during said recording of said graphical marks, pauses in user input actions defining
boundaries between said uninterrupted graphical marks.

9. The method according to claim 7, said erasure option
erasing at least a portion of a first uninterrupted graphical mark, without erasing any portions of second uninterrupted graphical marks, irrespective of spatial overlap between said first uninterrupted graphical mark and said uninterrupted second graphical marks as displayed on said graphic user interface.

10. The method according to claim 7, said erasure option
distinguishing between erasing different ones of said uninterrupted graphic marks, irrespective of an order in which said uninterrupted graphic marks are input and recorded.

11. The method according to claim 7, said erasure option receiving user input comprising input other than keyboard button input.

12. The method according to claim 7, said graphical marks and erasure input executing said erasure option being input through at least one of: a touch-sensitive screen; a computer mouse; a touchpad; a stylus; a trackball; a joystick; and a device that records user movements.

13. A computerized apparatus comprising:
a graphic user interface recording graphical marks, said graphical marks comprising input other than keyboard button input; and
a processor operatively connected to said graphic user interface,
said processor identifying whether said graphic marks are uninterrupted graphic marks distinguished from one another, an uninterrupted graphical mark being distinguished from other ones of said uninterrupted graphical marks by being one of said graphical marks input through a discrete and continuous user input action and being made without pausing said discrete and continuous user input action,
said graphic user interface displaying said graphical marks,
said graphic user interface providing an erasure option executed by non-keyboard erasure movements,
said erasure option allowing a user to distinguish which of overlapping ones of said uninterrupted graphical marks are erased based on said non-keyboard erasure movements and said identifying whether said graphic marks are uninterrupted graphic marks distinguished from one another, irrespective of spatial overlap between said uninterrupted graphical marks as displayed on said graphic user interface.

14. The computerized apparatus according to claim 13, during said recording of said graphical marks, pauses in user input actions defining
boundaries between said uninterrupted graphical marks.

15. The computerized apparatus according to claim 13, said erasure option erasing
at least a portion of a first uninterrupted graphical mark, without erasing any portions of second uninterrupted graphical marks, irrespective of spatial overlap between said first uninterrupted graphical mark and said uninterrupted second graphical marks as displayed on said graphic user interface.

16. The computerized apparatus according to claim 13, said erasure option
distinguishing between erasing different ones of said uninterrupted graphic marks, irrespective of an order in which said uninterrupted graphic marks are input and recorded.

17. The computerized apparatus according to claim 13, said erasure option receiving user input comprising input other than keyboard button input.

18. The computerized apparatus according to claim 13, further comprising at least one of: a touch-sensitive screen; a computer mouse; a touchpad; a stylus; a trackball; a joystick; and a device that records user movements,
said graphical marks and erasure input executing said erasure option being input through at least one of: said touch-sensitive screen; said computer mouse; said touchpad; said stylus; said trackball; said joystick; and said device that records user movements.

19. A tangible computer readable storage medium readable by a computerized device, said tangible computer readable storage medium storing instructions executable by said computerized device to perform a method comprising:
recording graphical marks input through a graphic user interface of a computerized device, said graphical marks comprising input other than keyboard button input, said recording including recording different input times when different ones of said graphical marks are input to distinguish said graphical marks from one another by said different input times, using a processor of said computerized device;

displaying said graphical marks on said graphic user interface; and providing an erasure option on said graphic user interface executed by non-keyboard erasure movements, said erasure option allowing a user to distinguish which of overlapping ones of said graphical marks are erased based on said non-keyboard erasure movements and said different input times irrespective of spatial overlap between said graphical marks as displayed on said graphic user interface.

20. The tangible computer readable storage medium according to claim 19, during said recording of said graphical marks, pauses in user input actions defining boundaries of said different input times.

21. The tangible computer readable storage medium according to claim 19, said erasure option erasing at least a portion of a first graphical mark made within a single one of said different input times, without erasing any portions of second graphical marks made at different ones of said different input times, irrespective of spatial overlap between said first graphical mark and said second graphical marks as displayed on said graphic user interface.

22. The tangible computer readable storage medium according to claim 19, said erasure option distinguishing between erasing said graphic marks input at said different input times, irrespective of an order in which said graphic marks are input and recorded.

23. The tangible computer readable storage medium according to claim 19, said erasure option receiving user input comprising input other than keyboard button input.

24. The tangible computer readable storage medium according to claim 19, said graphical marks and erasure input executing said erasure option being input through at least one of: a touch-sensitive screen; a computer mouse; a touchpad; a stylus; a trackball; a joystick; and a device that records user movements.

* * * * *